(12) United States Patent
Ichinose

(10) Patent No.: US 12,506,934 B2
(45) Date of Patent: Dec. 23, 2025

(54) MOVING-IMAGE DELIVERY SYSTEM, PLAYBACK DEVICE, PLAYBACK METHOD, PROGRAM, AND RECORDING MEDIUM

(71) Applicant: DWANGO CO., LTD., Tokyo (JP)

(72) Inventor: Keiichi Ichinose, Tokyo (JP)

(73) Assignee: DWANGO CO., LTD., Tokyo (JP)

( * ) Notice: Subject to any disclaimer, the term of this patent is extended or adjusted under 35 U.S.C. 154(b) by 0 days.

(21) Appl. No.: 18/292,123

(22) PCT Filed: Jul. 11, 2022

(86) PCT No.: PCT/JP2022/027210
§ 371 (c)(1),
(2) Date: Jan. 25, 2024

(87) PCT Pub. No.: WO2023/008156
PCT Pub. Date: Feb. 2, 2023

(65) Prior Publication Data
US 2024/0340501 A1 Oct. 10, 2024

(30) Foreign Application Priority Data
Jul. 29, 2021 (JP) .................................. 2021-124308

(51) Int. Cl.
*H04N 21/4722* (2011.01)
*H04N 21/254* (2011.01)
(Continued)

(52) U.S. Cl.
CPC ..... *H04N 21/4722* (2013.01); *H04N 21/2665* (2013.01); *H04N 21/44016* (2013.01); *H04N 21/4882* (2013.01); *H04N 21/254* (2013.01)

(58) Field of Classification Search
CPC ......... H04N 21/4722; H04N 21/44016; H04N 21/4882; H04N 21/4316; H04N 21/2668;
(Continued)

(56) References Cited

U.S. PATENT DOCUMENTS

2014/0255002 A1* 9/2014 Baldwin .................. H04N 5/93
2018/0234738 A1* 8/2018 Sarkar ................ H04N 21/4858

FOREIGN PATENT DOCUMENTS

JP 2008182674 A 8/2008
JP 2013037670 A 2/2013
(Continued)

OTHER PUBLICATIONS

International Search Report issued on Aug. 30, 2022, in corresponding International Application No. PCT/JP2022/027210; 4 pages.
(Continued)

*Primary Examiner* — Anthony Bantamoi
(74) *Attorney, Agent, or Firm* — Maier & Maier, PLLC

(57) ABSTRACT

A moving-image delivery system including a recording/playback device 1 for playing back television broadcast programs and live moving images, and a moving-image delivery server 5 for delivering live moving images. The recording/playback device 1 is provided with: a delivery request unit 12 for transmitting a delivery request that requests the delivery of live moving images of a television broadcast program, the delivery request including meta-information for specifying a television broadcast program when playing back television broadcast programs; and a display control unit 13 for, upon receiving the delivery of a live moving image, outputting a display screen image in which the television broadcast program and the live moving image are displayed in the same screen image. The moving-image server 5, upon receiving a delivery request, starts delivering live moving images of the television broadcast program specified by the meta-information included in the delivery request.

18 Claims, 5 Drawing Sheets

(51) Int. Cl.
*H04N 21/2665* (2011.01)
*H04N 21/44* (2011.01)
*H04N 21/488* (2011.01)

(58) Field of Classification Search
CPC . H04N 21/435; H04N 21/437; H04N 21/4788
See application file for complete search history.

(56) References Cited

FOREIGN PATENT DOCUMENTS

| | | |
|---|---|---|
| JP | 6866524 B1 | 4/2021 |
| JP | 2021097326 A | 6/2021 |
| JP | 2015138215 A | 7/2025 |

OTHER PUBLICATIONS

"Niconico Live", operated by Dwango Co., Ltd., Internet <URL: https://jk.nicovideo.jp/>; 1 page.
Office Action issued on Jul. 1, 2025, in corresponding Japanese Application No. 2021-188326, 10 pages.

* cited by examiner

MOVING-IMAGE DELIVERY SYSTEM, PLAYBACK DEVICE, PLAYBACK METHOD, PROGRAM, AND RECORDING MEDIUM

FIELD

The present invention relates to a moving-image delivery system, a playback device, a playback method, program, and a recording medium.

BACKGROUND

A network service is known in which viewers post comments and share the excitement for a television broadcast program that is on air (NPL 1).

In a moving-image delivery service, the popularity of a moving image in which a deliverer delivers live some contents, such as a game commentary, increases.

CITATION LIST

NPL 1: "Niconico Live", operated by DWANGO Co., Ltd., Internet <URL: https://jk.nicovideo.jp/>

SUMMARY

In the service of NPL 1, unspecified users are capable of sharing the excitement, and thus, the service is useful as a method for enjoying a video content such as a television broadcast program. However, in the service of NPL 1, it is not allowed to enjoy the video content together with the commentary of a favorite deliverer. There is a demand for watching a video content and a live broadcast of the video content of the deliverer.

The invention has been made in consideration of the circumstances described above, and an object thereof is to play back a video content and a live broadcast of the video content.

A moving-image delivery system of one aspect of the invention, includes: a playback device playing back a video content; and a moving-image delivery server delivering a live moving image, in which the playback device includes: a delivery request unit transmitting a delivery request that includes content information for specifying the video content and requests a delivery of the live moving image of the video content when playing back the video content; and a display control unit outputting a display screen in which the video content and the live moving image are displayed in the same screen by receiving the delivery of the live moving image, and the moving-image delivery server starts the delivery of the live moving image of the video content specified by the content information included in the delivery request when receiving the delivery request.

According to the invention, it is possible to play back the video content and the live broadcast of the video content.

DETAILED DESCRIPTION

Hereinafter, an embodiment of the invention will be described by using the drawings.

[Configuration of System]

Figure 1:
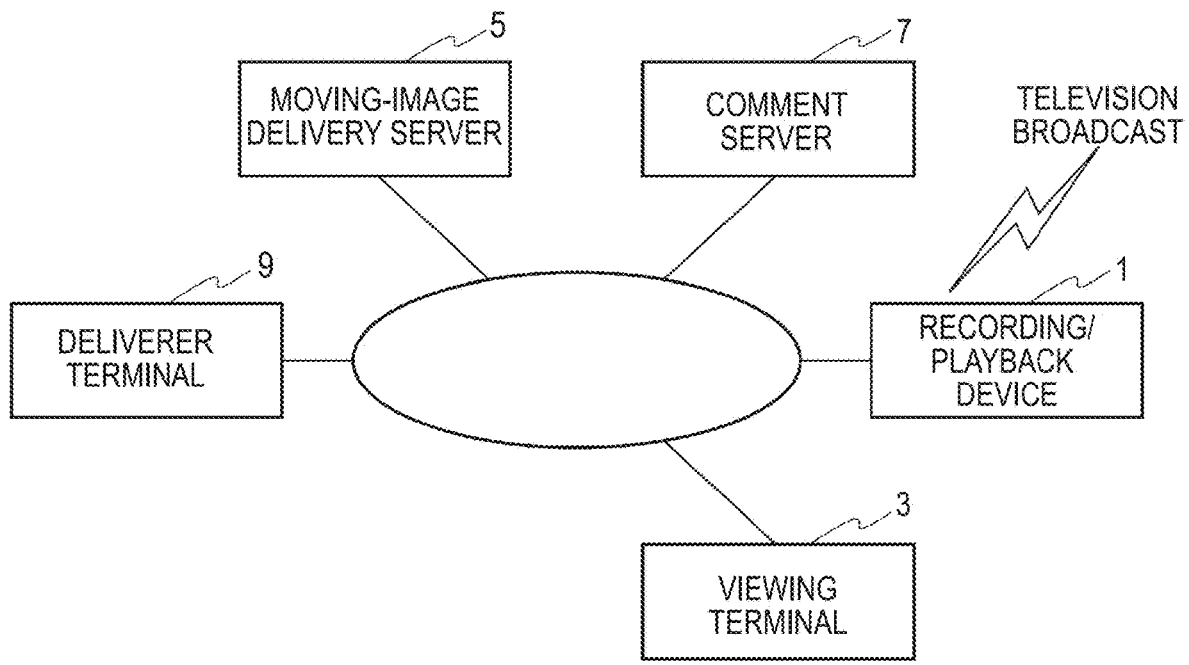
FIG. 1 is a diagram illustrating an example of an overall configuration of a moving-image delivery system including a recording/playback device of this embodiment.

A moving-image delivery system including a recording/playback device 1 of this embodiment will be described with reference to FIG. 1. The moving-image delivery system illustrated in the same drawing includes a recording/playback device 1, a viewing terminal 3, a moving-image delivery server 5, a comment server 7, and a deliverer terminal 9. The devices are connected to each other through a network such that communication is available. The recording/playback device 1 and the viewing terminal 3 may be connected to each other through a user home network. Note that, the number of devices illustrated in FIG. 1 is an example, and is not limited thereto.

The deliverer terminal 9 is a terminal that is used by a deliverer delivering a moving image. In this embodiment, an example will be described in which the deliverer delivers a live moving image for broadcasting live a television broadcast program. The live moving image of the television broadcast program, for example, is a moving image in which the deliverer speaks while viewing the television broadcast program. A viewer of the live moving image watches the live moving image while watching the same television broadcast program as that of the deliverer, and thus, is capable of viewing the television broadcast program with the deliverer.

The moving-image delivery server 5 is a server delivering the moving image received from the deliverer terminal 9 to the viewer through a network. The moving-image delivery server 5 delivers the live moving image received from the deliverer terminal 9 in real time, and stores the live moving image in a storage device of the moving-image delivery server 5. The moving-image delivery server 5 not only delivers the live moving image in real time, but also delivers the live moving image in a time-shift manner.

The comment server 7 is a server that receives a comment input with respect to the moving image by the viewer, and delivers the received comment to the viewer of the moving image. The comment server 7 stores the received comment in the storage device of the comment server 7, together with a receiving time, for each moving image. In the case of the live moving image, a viewer who is viewing the live moving image in real time is capable of posting the comment. The deliverer reads the posted comment, or reacts with respect to the comment. In a case where a viewer views the live moving image in a time-shift manner, the comment server 7 delivers the comment posted with respect to the live moving image to the viewer in accordance with a playback time (a time stamp). Accordingly, the viewer viewing the live moving image in a time-shift manner is capable of watching the comment posted by the viewer who has viewed the live moving image in real time.

The recording/playback device 1 is a device that receives and records the television broadcast program, and plays back the recorded television broadcast program, in accordance with the request of the user. The recording/playback device 1 is also capable of playing back the moving image delivered by the moving-image delivery server 5. The recording/playback device 1 outputs a screen in which a playback screen of the television broadcast program and a playback screen of the live moving image received from the moving-image delivery server 5 are displayed to the viewing terminal 3 when playing back the television broadcast program.

The viewing terminal 3 is a terminal displaying the screen output by the recording/playback device 1. In the viewing terminal 3, for example, a terminal including a display device, such as a television, a display, or a mobile terminal, can be used.

[Configuration of Recording/Playback Device]

Figure 2:
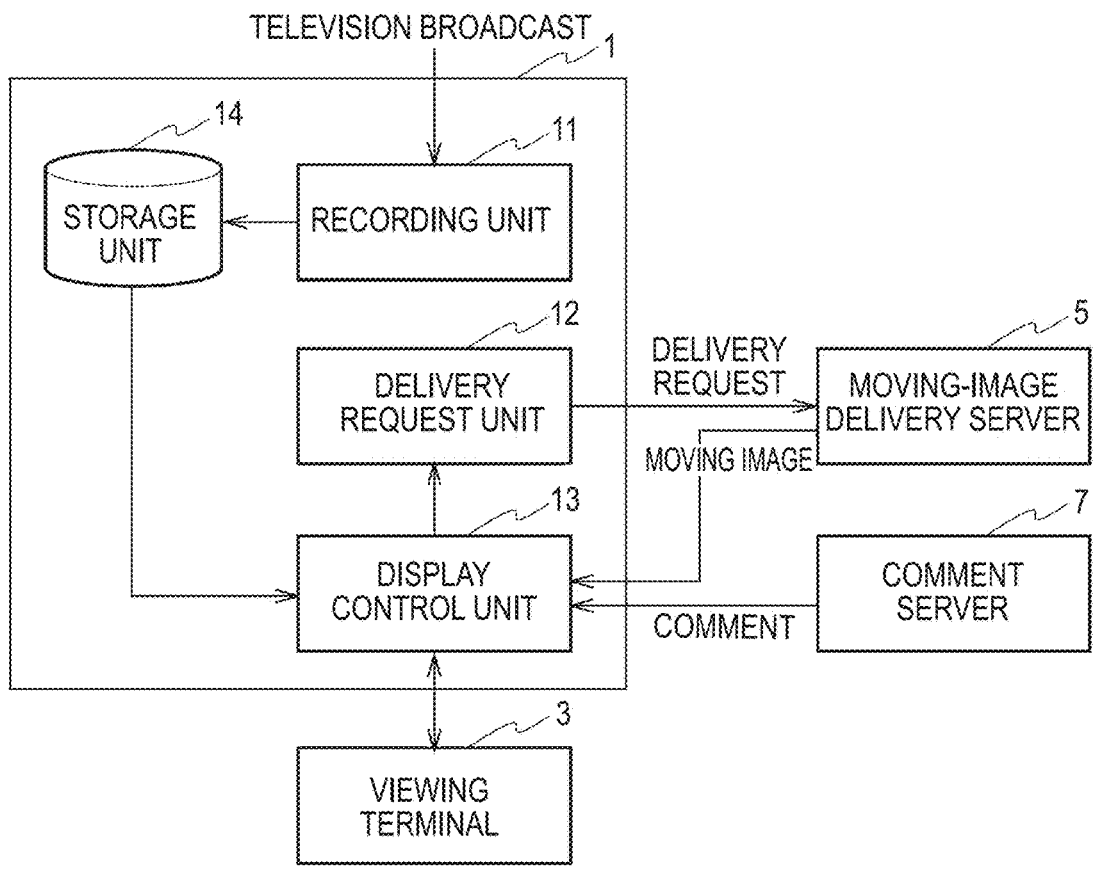
FIG. 2 is a diagram illustrating an example of a configuration of the recording/playback device.

Next, an example of the configuration of the recording/playback device 1 will be described with reference to FIG. 2. The recording/playback device 1 illustrated in FIG. 2 includes a recording unit 11, a delivery request unit 12, a display control unit 13, and a storage unit 14. Each unit of the recording/playback device 1 may be configured by a computer including an arithmetic processing device, a storage device, and the like, and the processing of each unit may be executed by a program. Such a program is stored in the storage device of the recording/playback device 1, and can also be recorded in a recording medium such as a magnetic disk, an optical disk, and a semiconductor memory, or can also be provided through a network.

The recording unit 11 receives the television broadcast program and stores the television broadcast program in the storage unit 14.

The delivery request unit 12 transmits a delivery request for the moving image to the moving-image delivery server 5, and requests the delivery of the moving image. When requesting the delivery of the live moving image of the television broadcast program, the delivery request unit 12 includes meta-information for specifying the television broadcast program, such as a channel, a broadcast time, and a program name, in the delivery request. In the case of receiving the delivery request, the moving-image delivery server 5 starts the delivery of the live moving image of the television broadcast program specified by the meta-information included in the delivery request. The delivery request for the live moving image may include information for designating the deliverer, in addition to the meta-information of the television broadcast program. In this case, the moving-image delivery server 5 starts the delivery of the live moving image of the television broadcast program by the designated deliverer.

The display control unit 13 plays back the television broadcast program stored in the storage unit 14 and plays back the live moving image of the television broadcast program at the same time, in accordance with an instruction from the user. The television broadcast program and the live moving image of the television broadcast program are combined by the meta-information. The display control unit 13 provides a user interface for selecting the television broadcast program stored in the storage unit 14 and a user interface for selecting the moving image delivered by the moving-image delivery server 5.

Specifically, the display control unit 13 displays a list of the television broadcast programs stored in the storage unit 14, and receives the selection of the television broadcast program for playback from the user. In the case of receiving a playback request for the television broadcast program, the display control unit 13 transmits the meta-information of the television broadcast program to the delivery request unit 12. The delivery request unit 12 requests the moving-image delivery server 5 to deliver the live moving image of the television broadcast program. The display control unit 13 receives the delivery of the live moving image, and plays back the television broadcast program stored in the storage unit 14 and plays back the live moving image.

Alternatively, the display control unit 13 displays a list of the live moving images delivered by the moving-image delivery server 5, and receives the selection of the live moving image for playback from the user. The delivery request unit 12 requests the moving-image delivery server 5 to deliver the selected live moving image. The display control unit 13 plays back the television broadcast program corresponding to the live moving image and plays back the live moving image that is delivered by the moving-image delivery server 5.

When playing back the live moving image, the display control unit 13 may receive the comment input with respect to the live moving image from the comment server 7 to be superimposed on the display screen.

The storage unit 14 stores the recording of the television broadcast program. The storage unit 14 retains the meta-information such as the channel, the broadcast time, or the like of the television broadcast program. The storage unit 14 may be the storage device of the recording/playback device 1, or may be an external storage device connected to the recording/playback device 1.

Note that, the recording/playback device 1 may include only the recording unit 11 and the storage unit 14, and the viewing terminal 3 may include the delivery request unit 12 and the display control unit 13, or another device disposed between the recording/playback device 1 and the viewing terminal 3 may include the delivery request unit 12 and the display control unit 13.

[Operation of Moving-Image Delivery System]

Next, an example of the flow of the processing of the moving-image delivery system will be described with reference to sequence diagrams of FIG. 3 and FIG. 4.

Figure 3:
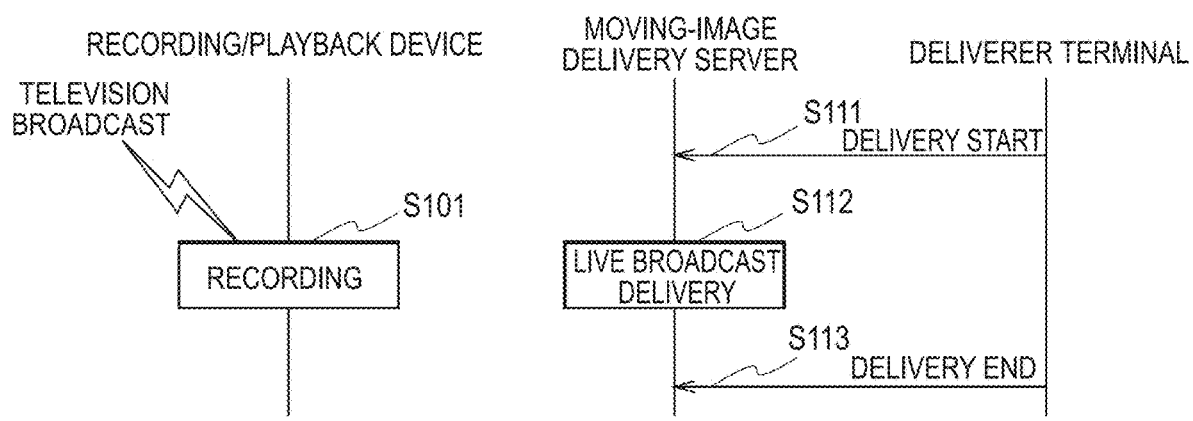
FIG. 3 is a sequence diagram illustrating an example of a flow of processing of the moving-image delivery system during a television broadcast.

FIG. 3 is a sequence diagram illustrating an example of the flow of the processing of the moving-image delivery system during a television broadcast.

In a case where the television broadcast is started, in step S101, the recording/playback device 1 starts the recording of the television broadcast program.

In step S111, the deliverer starts the delivery of a live broadcast program for broadcasting live the television broadcast program. For example, the deliverer terminal 9 notifies the start of the delivery to the moving-image delivery server 5, and starts the delivery of the live broadcast program. In a case where the deliverer delivers live the television broadcast program, the deliverer terminal 9 notifies the meta-information of the television broadcast program broadcasted live by the deliverer to the moving-image delivery server 5.

In step S112, the moving-image delivery server 5 receives the live broadcast program from the deliverer terminal 9, and delivers the live broadcast program to the viewer and at the same time, stores the live broadcast program in the storage device as the live moving image. The moving-image delivery server 5 applies meta-information of the television broadcast program and a delivery start time of the live broadcast program to the live moving image. The viewer is capable of viewing the live broadcast program of the deliverer in real time while watching the television broadcast program.

In step S113, in a case where the television broadcast program is ended, the deliverer ends the delivery of the live broadcast program. The deliverer may continuously deliver the live broadcast program.

Figure 4:
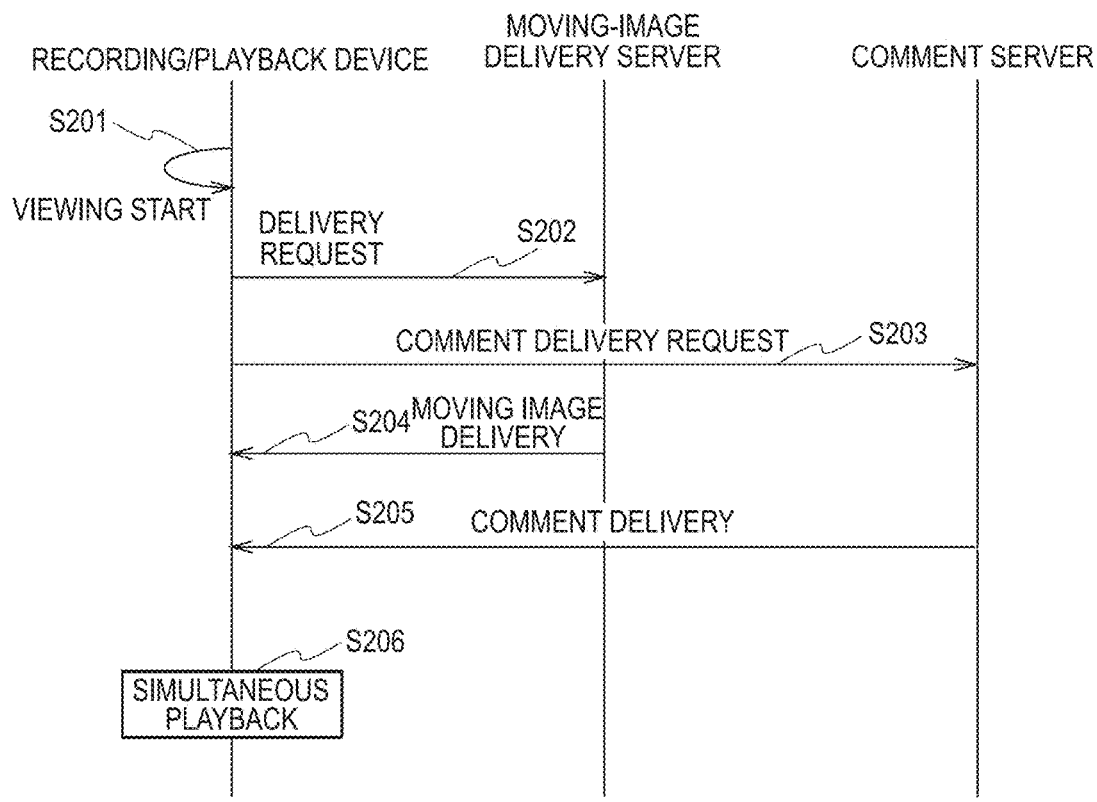
FIG. 4 is a sequence diagram illustrating an example of a flow of processing of the moving-image delivery system when viewing a recorded television broadcast program.

FIG. 4 is a sequence diagram illustrating an example of the flow of the processing of the moving-image delivery system when viewing the television broadcast program recorded in the recording/playback device 1.

In step S201, the user manipulates the recording/playback device 1, and starts the playback of the recorded television broadcast program.

In step S202, the recording/playback device 1 requests the moving-image delivery server 5 to deliver the live moving image corresponding to the television broadcast program for playback. Specifically, the recording/playback device 1 transmits the delivery request including the meta-information of the television broadcast program for playback to the moving-image delivery server 5. The moving-image delivery server 5 searches the live moving image to which the meta-information of the television broadcast program is applied, and returns ID of the live moving image obtained by the search to the recording/playback device 1.

In step S203, the recording/playback device 1 requests the comment server 7 to deliver the comment corresponding to the live moving image. Specifically, the recording/playback device 1 transmits a comment delivery request including ID of the live moving image to the comment server 7.

In step S204, the delivery of the live moving image from the moving-image delivery server 5 is started, and in step S205, the delivery of the comment from the comment server 7 is started.

In step S206, the recording/playback device 1 plays back the television broadcast program and at the same time, plays back the live moving image, and displays the comment to be superimposed on the screen.

[Operation of Recording/Playback Device]

Next, an example of the operation of the recording/playback device 1 will be described with reference to flowcharts of FIG. 5 and FIG. 6.

Figure 5:
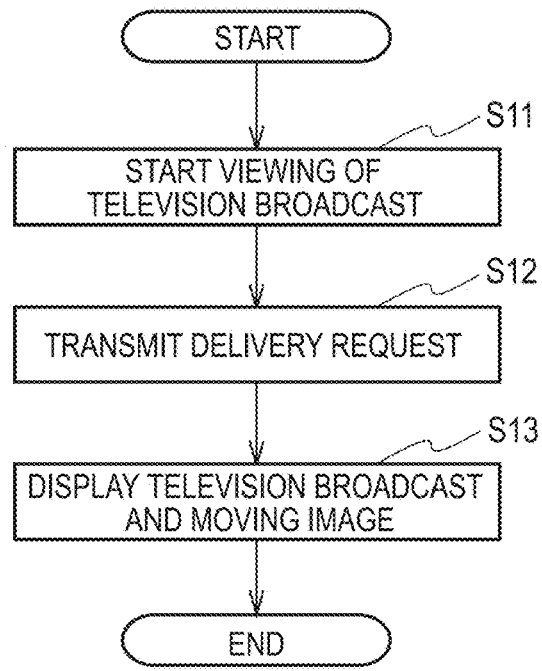
FIG. 5 is a flowchart illustrating an example of a flow of processing of the recording/playback device when viewing the television broadcast program.

FIG. 5 is a flowchart illustrating an example of the flow of the processing of the recording/playback device 1 when viewing the television broadcast program.

In step S11, the recording/playback device 1 receives the selection of the television broadcast program for playback from the user. For example, the recording/playback device 1 displays the list of the television broadcast programs stored in the storage unit 14, and receives the selection of the television broadcast program for playback from the user.

In step S12, the recording/playback device 1 transmits the delivery request for the live moving image corresponding to the television broadcast program for playback to the moving-image delivery server 5. The delivery request includes the channel, the broadcast time, or the title of the television broadcast program, as the meta-information for specifying the television broadcast program. The delivery request may include deliverer information for designating the deliverer.

For example, the user registers a favorite deliverer in the recording/playback device 1. The recording/playback device 1 transmits the delivery request by including the deliverer information of the registered deliverer. The recording/playback device 1 may include the deliverer of the moving image that the user often views in the delivery request, as the deliverer information. A plurality of deliverer information pieces may be included in the delivery request.

In the case of receiving the delivery request, the moving-image delivery server 5 starts the delivery of the live moving image according to the delivery request. Specifically, the moving-image delivery server 5 specifies the television broadcast program from the meta-information of the television broadcast program included in the delivery request, and searches and delivers the live moving image of the specified television broadcast program. In a case where there are a plurality of corresponding live moving images, a list of the corresponding live moving images may be transmitted to the recording/playback device 1. The list of the live moving images, for example, is a list of IDs of the live moving images.

In the case of receiving the list of the live moving images, the recording/playback device 1 may present the list to the user and receive the selection of the live moving image desired to be delivered from the user, or the recording/playback device 1 may select any live moving image from the list. In a case where the live moving image is selected, the recording/playback device 1 requests the moving-image delivery server 5 to deliver the live moving image. In this case, the delivery request includes ID of the live moving image.

The recording/playback device 1 may transmit the comment delivery request including ID of the live moving image to the comment server 7, and may request the comment server 7 to deliver the comment corresponding to the live moving image.

In step S13, the recording/playback device 1 starts the playback of the television broadcast program stored in the storage unit 14, and starts the playback of the live moving image delivered by the moving-image delivery server 5. For example, the recording/playback device 1 outputs the screen in which the video of the live moving image is superimposed in the video of the television broadcast program to the viewing terminal 3 and outputs both of the sound of the television broadcast program and the sound of the live moving image. An example of the display screen will be described below.

The recording/playback device 1 may adjust the playback position of the live moving image such that the playback timings of the television broadcast program and the live moving image are not greatly shifted from each other. For example, in a case where the playback positions of the television broadcast program and the live moving image are apart from each other by a predetermined threshold value or more, the recording/playback device 1 changes the playback position of the live moving image, in accordance with the time stamp of the television broadcast program. The start time of the television broadcast program can be specified, and the delivery start time of the live moving image can also be specified. In a case where the television broadcast program is forwarded t or rewound, the recording/playback device 1 changes the playback position of the live moving image, in accordance with the playback position of the television broadcast program.

Figure 6:
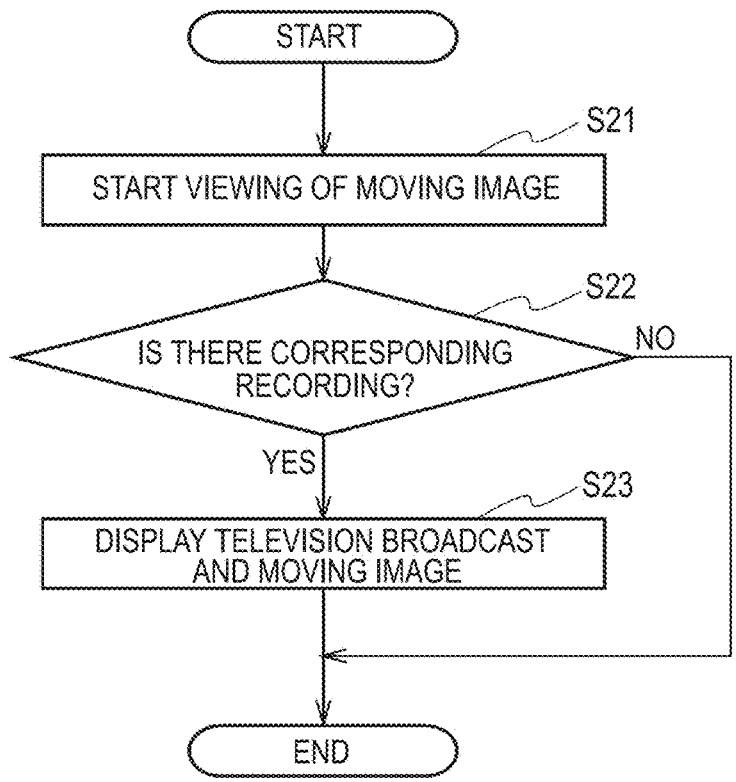
FIG. 6 is a flowchart illustrating an example of a flow of processing of the recording/playback device when viewing a live moving image.

FIG. 6 is a flowchart illustrating an example of the flow of the processing of the recording/playback device 1 when viewing the live moving image. In the processing of FIG. 5, the recording/playback device 1 requests the delivery of the live moving image corresponding to the television broadcast program selected by the user, but in the processing of FIG. 6, the television broadcast program corresponding to the live moving image viewed by the user is simultaneously played back.

In step S21, the recording/playback device 1 receives the selection of the moving image for playback from the user, and transmits the delivery request for the selected moving image to the moving-image delivery server 5. For example, the recording/playback device 1 receives a list of the moving images from the moving-image delivery server 5, presents the list to the user, and receives the selection of the moving image. The recording/playback device 1 transmits the delivery request including ID of the selected moving image to the moving-image delivery server 5.

In step S22, the recording/playback device 1 determines whether there is the recording of the television broadcast program corresponding to the moving image for playback. Specifically, in a case where the meta-information of the television broadcast program is applied to the moving image for playback, the recording/playback device 1 specifies the television broadcast program corresponding to the meta-information of the moving image, and determines whether the recording of the corresponding television broadcast program is stored in the storage unit 14.

In a case where the meta-information of the television broadcast program is not applied to the moving image for playback, that is, in a case where it is not the live moving image of the television broadcast program, and in a case where there is no recording of the corresponding television broadcast program in the storage unit 14, the recording/playback device 1 plays back only the moving image.

In a case where there is the recording of the television broadcast program corresponding to the moving image for playback, in step S23, the recording/playback device 1 starts the playback of the television broadcast program stored in the storage unit 14 and starts the playback of the live moving image delivered by the moving-image delivery server 5.

Note that, the recording/playback device 1 may obtain in advance an association between the television broadcast program and the live moving image, may present a list of the television broadcast programs associated with the live moving image to the user, and may start the playback of the television broadcast program and the live moving image, in accordance with the manipulation of the user. For example, the recording/playback device 1 transmits the meta-information of the television broadcast program stored in the storage unit 14 to the moving-image delivery server 5 at any timing, acquires ID of the live moving image corresponding to the television broadcast program, and associates the television broadcast program and the live moving image with each other. During the playback, the recording/playback device 1 starts the playback of the television broadcast program stored in the storage unit 14, and transmits ID of the live moving image to the delivery server 5, receives the delivery of the live moving image, and plays back the live moving image.

Display Screen Example

Next, several examples of the display screen will be described with reference to FIG. 7 to FIG. 10.

Figure 7:
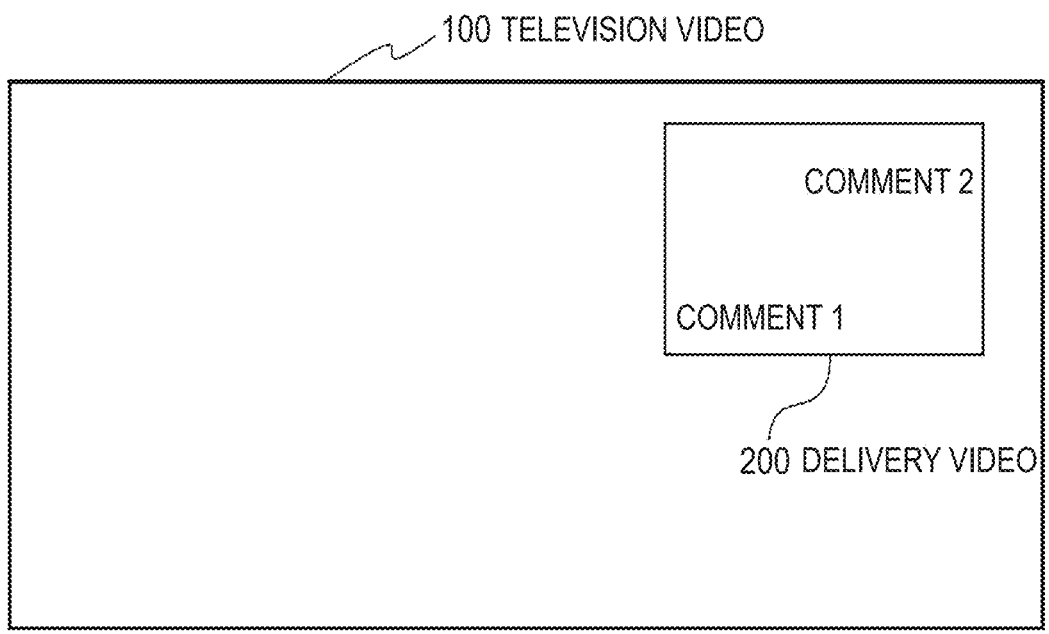
FIG. 7 is a diagram illustrating an example of a display screen in which a delivery video is superimposed on a television video.
Figure 8:
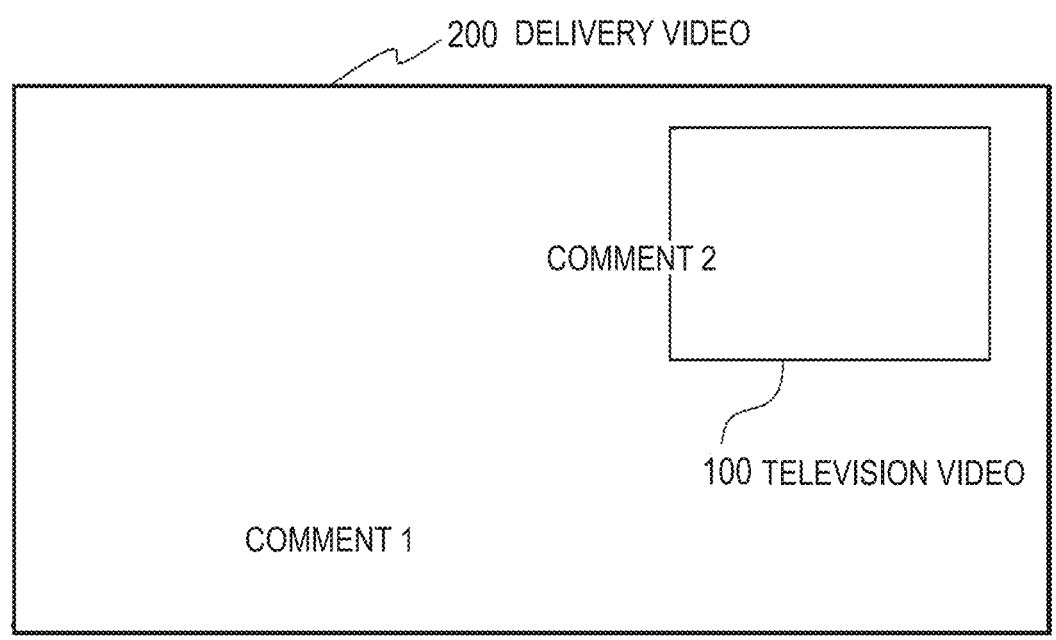
FIG. 8 is a diagram illustrating an example of a display screen in which the television video is superimposed on the delivery video.

In the example of FIG. 7, a delivery video 200 of the live moving image is superimposed on a television video 100. In the example of FIG. 8, the television video 100 is superimposed on the delivery video 200 of the live moving image.

As illustrated in FIG. 7 and FIG. 8, the recording/playback device 1 may output a display screen in which any one video is set to a main video, and the other video is superimposed on the main video as a sub-video. Which video is to be the main video, and the size and the position of the sub-video may be set arbitrarily, or the main video and the sub-video may be switched. The sub-video may be temporarily in a non-display state.

The sound of the main video and the sound of the sub-video are simultaneously output. Only the sound of the main video or the sound of the sub-video may be output.

The comment is displayed to appear from the right end of the screen and flow to the left end of the screen. In the example of FIG. 7, the comment is displayed only in the delivery video 200. That is, the comment is displayed to appear from the right end of the delivery video 200 and disappear at the left end of the delivery video 200. In the example of FIG. 7, the comment may be displayed to appear from the right end of the television video 100 and move to the left end.

In the example of FIG. 8, the television video 100 is superimposed on the delivery video 200, and thus, the comment is also displayed to be superimposed on the television video 100. In the example of FIG. 8, the comment may not be displayed on the television video 100. For example, the comment may be displayed only in a region above or below a position on which the television video 100 is superimposed, or the comment may be displayed on the layer of the delivery video 200 and the television video 100.

Figure 9:
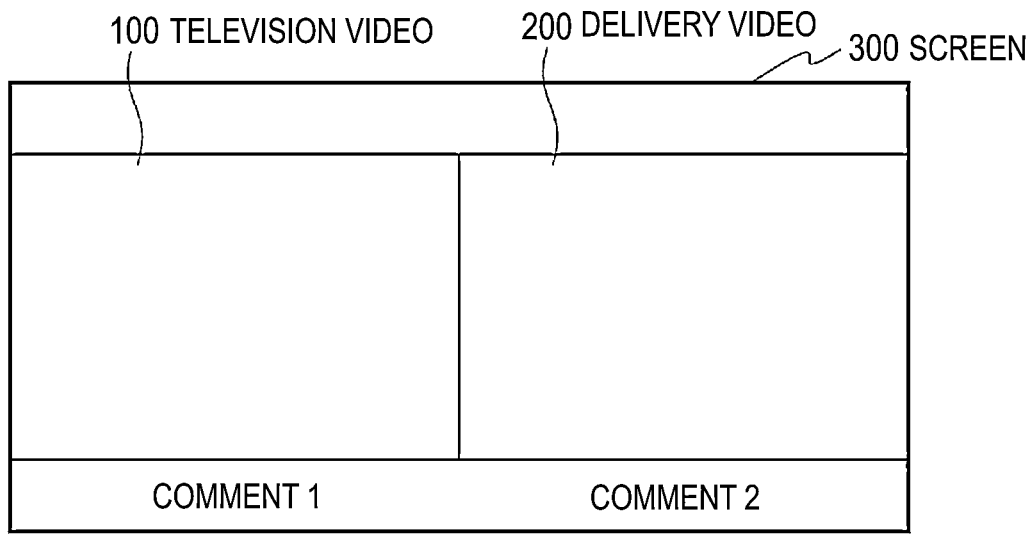
FIG. 9 is a diagram illustrating an example of a display screen in which the television video and the delivery video are not superimposed.

In the example of FIG. 9, in a screen 300, the television video 100 and the delivery video 200 are displayed in parallel. The television video 100 and the delivery video 200 may be displayed in the same screen 300 without being superimposed. In the example of FIG. 9, the television video 100 and the delivery video 200 are displayed in the same size, but the size of the television video 100 and the delivery video 200 may be arbitrarily changed.

In the example of FIG. 9, the comment is displayed in a region below the television video 100 and the delivery video 200 not to be superimposed on both of the videos. The comment may be displayed to be superimposed on the delivery video 200, or may be displayed to be superimposed on the television video 100.

Figure 10:
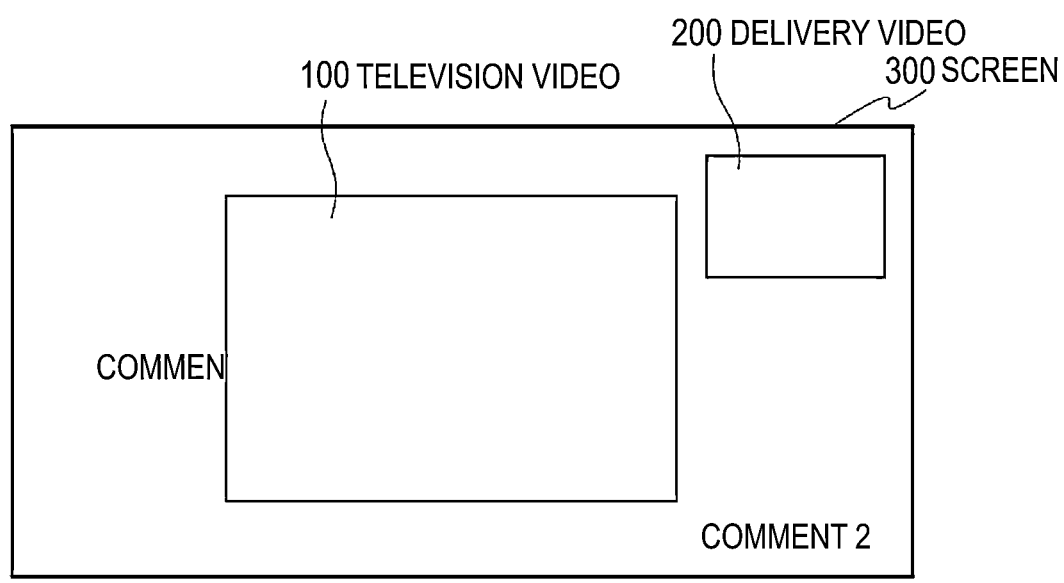
FIG. 10 is a diagram illustrating an example of a display screen in which the television video and the delivery video are displayed in the same screen.

In the example of FIG. 10, the television video 100 is displayed in the vicinity of the center of the screen 300 in a size smaller than that of the screen 300, and the delivery video 200 is displayed in a region around the television video 100. In the example of FIG. 10, the delivery video 200 is displayed in the upper right region of the television video 100. A position at which the delivery video 200 is displayed may be arbitrarily set. In the example of FIG. 10, the size of the delivery video 200 is a size fitting within the region around the television video 100, but may be a size overlapping with the television video 100. In a case where the television video 100 overlaps with the delivery video 200, the delivery video 200 may be displayed below the television video 100, or may be displayed to be superimposed on the television video 100.

In the example of FIG. 10, the comment is displayed in the entire region of the screen 300, on the layer below the television video 100. That is, the comment is displayed to appear from the right end of the screen 300 and flow to the left end of the screen 300 through the layer below the television video 100. The comment may be displayed to be superimposed on the delivery video 200, or may be displayed on the layer below the delivery video 200. Note that, the comment may be displayed on the top layer of the screen 300. That is, the comment may be displayed to be superimposed on the television video 100 and the delivery video 200.

Note that, in any of FIG. 7 to FIG. 10, the comment may be displayed to flow not only from left to right, but also from right to left, from bottom to top, or from top to bottom.

In addition, a display for a gift inserted during the live broadcast of the live moving image may be reproduced in the delivery video 200 in a time-shift manner, or may be reproduced on the entire display screen.

Modification Example

The recording/playback device 1 may simultaneously display the television broadcast program and the live broadcast of the live moving image in real time. That is, when viewing not only the recorded television broadcast program but also the television broadcast program in real time, the recording/playback device 1 may simultaneously display the television broadcast program and the live broadcast of the live moving image.

The recording/playback device 1 may simultaneously display not only the television broadcast program but also the video content delivered through a network and the live moving image of the video content. For example, in a case where the deliverer delivers the commentary of a movie (the video content) delivered by a movie delivery service, the meta-information (for example, a delivery service name, a video content name, and the like) of the video content is applied to the live moving image to be delivered. When playing back the live moving image, the recording/playback device 1 specifies the video content from the meta-information applied to the live moving image, and plays back the live moving image and the video content in the same screen in an environment where the user is capable of viewing the video content (for example, in a case where the user has been registered to the movie delivery service). Alternatively, when playing back the video content, the recording/playback device 1 enquires the moving-image delivery server 5 about whether there is the live moving image of the video content. In a case where there is the live moving image, the recording/playback device 1 plays back the video content and the live moving image in the same screen. The video content is not limited to the movie, and may be any content that can be viewed on the recording/playback device 1.

In addition, the video of the live moving image may not be displayed, and only the sound of the live moving image may be output together with the sound of the television broadcast program, and in a case where closed captioning is provided to the live moving image, character information of the live moving image may be superimposed on the video of the television broadcast program.

As described above, the moving-image delivery system of this embodiment is a moving-image delivery system including the recording/playback device 1 playing back the television broadcast program and the live moving image, and the moving-image delivery server 5 delivering the live moving image. The recording/playback device 1 includes the delivery request unit 12 transmitting the delivery request that includes the meta-information for specifying the television broadcast program and requests the delivery of the live moving image of the television broadcast program when playing back the television broadcast program, and the display control unit 13 outputting the display screen in which the television broadcast program and the live moving image are displayed in the same screen by receiving the delivery of the live moving image. The moving-image delivery server 5 starts the delivery of the live moving image of the television broadcast program specified by the meta-information included in the delivery request when receiving the delivery request. Accordingly, the user is capable of easily viewing the television broadcast program and the live moving image simultaneously.

REFERENCE SIGNS LIST

1: recording/playback device
11: recording unit
12: delivery request unit
13: display control unit
14: storage unit
3: viewing terminal
5: moving-image delivery server
7: comment server
9: deliverer terminal

The invention claimed is:

1. A moving-image delivery system, comprising: a playback device playing back a video content and a live moving image of the video content; and a moving-image delivery server delivering the live moving image, wherein the playback device includes: a delivery request unit transmitting a delivery request that includes content information for specifying the video content and requests a delivery of the live moving image of the video content when playing back the video content; and a display control unit outputting a display screen in which the video content and the live moving image are displayed in the same screen by receiving the delivery of the live moving image, and the moving-image delivery server starts the delivery of the live moving image of the video content specified by the content information included in the delivery request when receiving the delivery request; wherein the video content is played back as live content; and the display control unit receives a comment posted with respect to the live moving image, and displays the received comment within the video content superimposed on the display screen.

2. The moving-image delivery system according to claim 1, wherein the delivery request unit is further configured to transmit a delivery request that includes live moving image information for specifying the live moving image and requests a delivery of the video content when playing back the live moving image.

3. The moving image delivery system according to claim 1, wherein the display control unit receives at least a second comment posted with respect to the live moving image, and displays both the comment and the second comment superimposed on the display screen.

4. The moving image delivery system according to claim 1, wherein the comment is displayed only in the live moving image.

5. The moving image delivery system according to claim 1, wherein the comment flows from a first side of the display screen to a second side of the display screen.

6. A playback device playing back a video content and a live moving image of the video content, the device comprising: a display control unit outputting a display screen in which the video content and the live moving image of the video content are displayed in the same screen, on the basis of content information that combines the video content with the live moving image; wherein the video content is played back as live content; and the display control unit receives a comment posted with respect to the live moving image, and displays the received comment within the video content superimposed on the display screen.

7. The playback device according to claim 6, further comprising a delivery request unit transmitting a delivery request that includes the content information for specifying the video content and requests a delivery of the live moving image of the video content when playing back the video content.

8. The playback device according to claim 6, further comprising a delivery request unit transmitting a delivery request that requests a delivery of the live moving image of the video content, wherein when playing back the live moving image of the video content, the display control unit outputs a display screen in which the video content and the live moving image are displayed in the same screen when the video content can be played back.

9. The playback device according to claim 8,
wherein the video content is a recording of a television broadcast program, and when the television broadcast program broadcasted live in the live moving image is recorded, the display control unit outputs a display screen in which the recording of the television broadcast program and the live moving image are displayed in the same screen.

10. The playback device according to claim 6,
wherein the video content is a video content delivered through a network.

11. The playback device according to claim 6, wherein the display control unit receives at least a second comment posted with respect to the live moving image, and displays both the comment and the second comment superimposed on the display screen.

12. The playback device according to claim 6, wherein the comment is displayed only in the live moving image.

13. The playback device according to claim 6, wherein the comment flows from a first side of the display screen to a second side of the display screen.

14. A playback method for playing back a video content and a live moving image of the video content, the method allowing a computer to output a display screen in which the video content and the live moving image of the video content are displayed in the same screen, on the basis of content information that combines the video content with the live moving image; wherein the video content is played back as live content; and the display control unit receives a comment posted with respect to the live moving image, and displays the received comment within the video content superimposed on the display screen.

15. The playback method according to claim 14, wherein the display control unit receives at least a second comment posted with respect to the live moving image, and displays both the comment and the second comment superimposed on the display screen.

16. The playback method according to claim 14, wherein the comment is displayed only in the live moving image.

17. The playback method according to claim 14, wherein the comment flows from a first side of the display screen to a second side of the display screen.

18. A non-transitory recording medium in which a program for operating a computer as a playback device playing back a video content and a live moving image of the video content is recorded, the program allowing the computer to execute processing of outputting a display screen in which the video content and the live moving image of the video content are displayed in the same screen, on the basis of content information that combines the video content with the live moving image; wherein the video content is played back as live content; and the display control unit receives a comment posted with respect to the live moving image, and displays the received comment within the video content superimposed on the display screen.

* * * * *